United States Patent [19]

Farber

[11] Patent Number: 4,723,695
[45] Date of Patent: Feb. 9, 1988

[54] FISHERMAN'S GARMENT AND LANDING NET SCABBARD

[76] Inventor: Hugh A. Farber, 2807 Highbrook, Midland, Mich. 48640

[21] Appl. No.: 926,589

[22] Filed: Nov. 4, 1986

[51] Int. Cl.⁴ .............................................. A45F 4/02
[52] U.S. Cl. ................................. 224/153; 224/182; 224/231; 224/252; 224/272; 2/94; 248/95
[58] Field of Search ............... 224/103, 151, 153, 182, 224/191, 231, 252, 255, 272, 901; 403/381, 71, 68; 248/95, 99; 383/33; 2/94, 95

[56] References Cited

U.S. PATENT DOCUMENTS

| | | | |
|---|---|---|---|
| 1,024,653 | 4/1912 | Sargent | 224/182 |
| 1,182,031 | 5/1916 | Paquette | 224/231 |
| 1,201,159 | 10/1916 | Dettmer | 224/231 |
| 1,426,024 | 8/1922 | Thureson | 224/202 |
| 1,564,293 | 12/1925 | Sturgis | 403/71 X |
| 2,079,220 | 5/1937 | Mahoney | 2/94 |
| 2,248,455 | 7/1941 | Freund | 2/94 |
| 2,448,804 | 9/1948 | Hutchinson | 2/94 |
| 2,592,087 | 4/1952 | Wallace | 224/231 X |
| 2,620,479 | 12/1952 | Buck | 2/94 |
| 2,717,391 | 9/1955 | Bracken | 2/94 |
| 2,755,480 | 7/1956 | Jones et al. | 2/94 |
| 4,059,207 | 11/1977 | Jackson et al. | 224/153 X |
| 4,068,480 | 1/1978 | Yellen et al. | 2/94 |
| 4,300,271 | 11/1981 | Wohlhaupter | 403/381 X |
| 4,369,526 | 1/1983 | Clutts | 2/94 X |

FOREIGN PATENT DOCUMENTS

| | | | |
|---|---|---|---|
| 1565553 | 5/1969 | France | 2/94 |
| 2505149 | 11/1982 | France | 224/182 |

Primary Examiner—Henry J. Recla
Assistant Examiner—Ernest Cusick
Attorney, Agent, or Firm—Learman & McCulloch

[57] ABSTRACT

A support for a fish landing net comprises a pouch of such size as to accommodate the net and having a mouth through which the net may pass into and out of the pouch. The mouth constantly is maintained in an open position by a stiffeningmember. The pouch may be permanently or removably secured to the back of a fisherman's garment.

10 Claims, 8 Drawing Figures

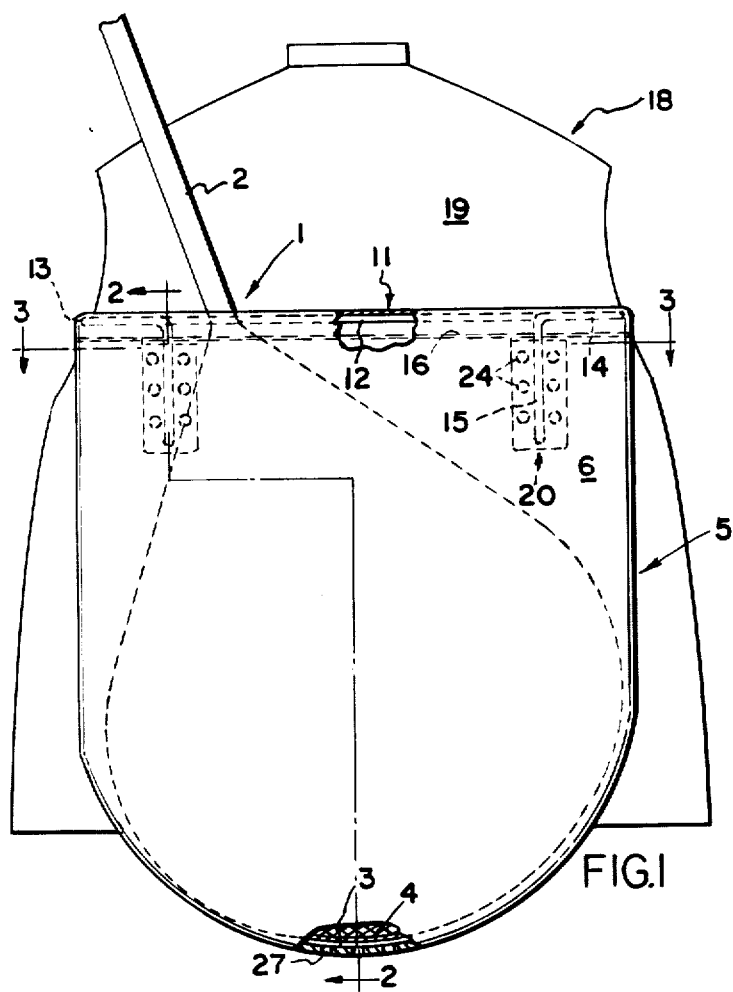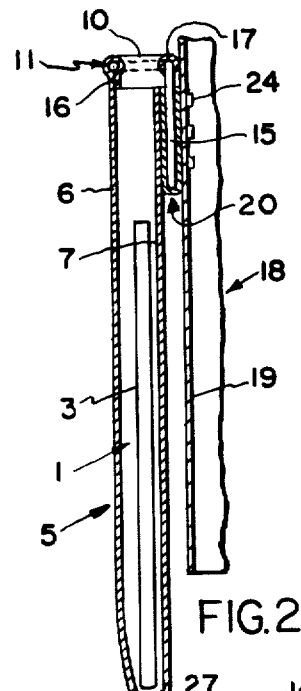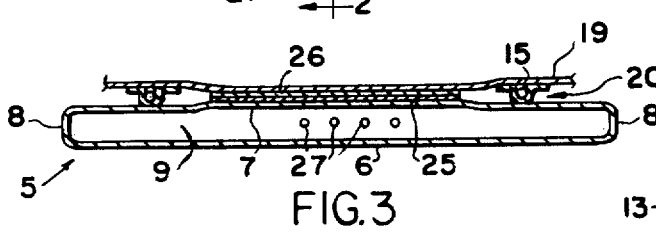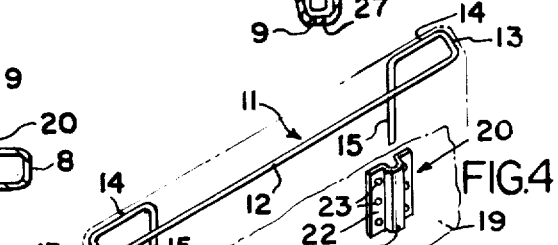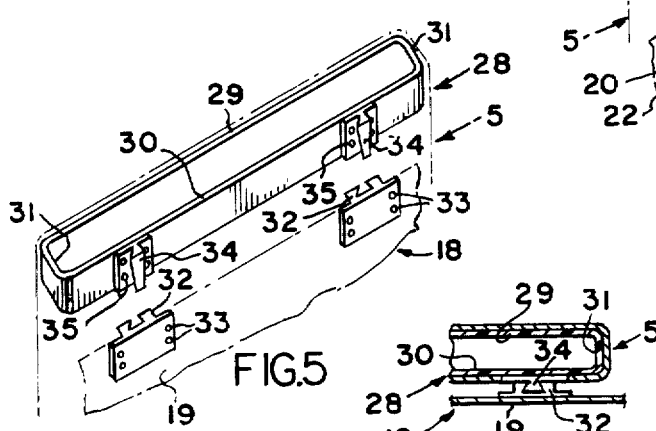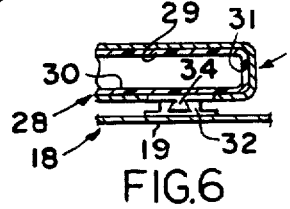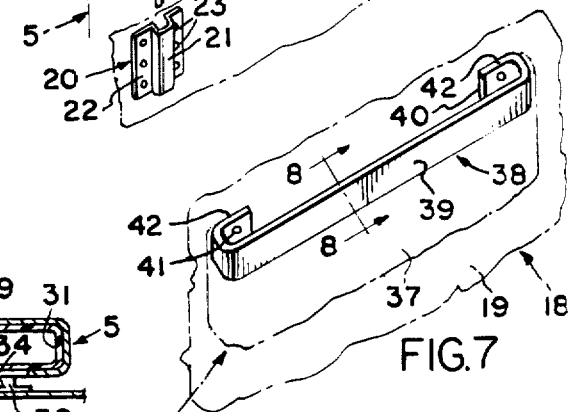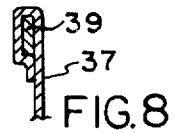

FISHERMAN'S GARMENT AND LANDING NET SCABBARD

This invention relates to a pouch-like support adapted for attachment to the back of a fisherman's garment for removably accommodating a fish landing net.

BACKGROUND OF THE INVENTION

A sport fisherman conventionally utilizes a landing net to facilitate removing a hooked fish from a stream, river, or other body of water. Such a net is used rather infrequently in comparison to the time spent in fishing, but when the need for the net arises the fisherman usually has his hands full in holding onto the fishing rod, guiding the fish, and maintaining his balance. Prior to the time that a net is needed to land a fish, the fisherman's hands are occupied with such operations as casting a fly or other lure and manipulating the rod and reel. It is desirable, therefore, that the landing net be supported in such manner as not to encumber the fisherman's hands, while enabling rapid removal of the net from its support, when necessary, as well as rapid and easy return of the net to its support when the fish has been landed.

A number of proposals have been made heretofore for storing a landing net in such position as to facilitate its handling by a fisherman. For example, nets have been provided with both elastic and nonelastic attaching cords, snap fasteners, and the like. All of the known proposals, however, have disadvantages in that they enable the net to be entangled with brush, encumber the fisherman, and preclude positioning the net in readiness for use under all conditions. In the case of a net having an elastic cord attached thereto, a net caught on a bush or tree may cause the cord to stretch, whereupon the net suddenly may be released and strike the fisherman with sufficient force to cause injury.

The object of the present invention is to provide a landing net support which overcomes the disadvantages referred to above.

SUMMARY OF THE INVENTION

A landing net support constructed in accordance with the invention includes a preferably fabric pouch or scabbard of such size as to accommodate a landing net therein and having a mouth through which the net may pass into and out of the pouch. The pouch may be permanently or removably attached to the back of a fisherman's coat, vest, harness, or the like with the mouth of the pouch facing upwardly. The depth of the pouch is such that, when the net is therein, the net handle extends through the mouth and above the pouch so as easily to be gripped by one hand, thereby enabling rapid removal of the net from the pouch.

The mouth of the pouch is maintained open to such an extent that the net may be returned to the pouch easily and quickly, using only one hand, when the need for the net has passed.

The mouth of the pouch is maintained open by a stiffener which, if desired, may include means for attaching the pouch securely to the fisherman's garment, but which will enable the pouch rapidly and easily to be removed from the garment when desired.

THE DRAWINGS

Preferred embodiments of the invention are disclosed in the following description and in the accompanying drawings, wherein:

FIG. 1 is an elevational view, partly broken away, illustrating a pouch fitted to the back of a fisherman's garment and supporting a landing net;

FIG. 2 is a sectional view taken on the line 2—2 of FIG. 1 but with the net;

FIG. 3 is a sectional view taken on the line 3—3 of FIG. 1 but with the net removed;

FIG. 4 is a fragmentary, isometric view of pouch stiffening and mounting means according to one embodiment, the pouch and the fisherman's garment being shown in phantom;

FIG. 5 is a view similar to FIG. 4, but illustrating another embodiment;

FIG. 6 is a fragmentary, sectional view indicating the manner in which the stiffening and attaching means shown in FIG. 5 may be used;

FIG. 7 is a fragmentary, isometric view of another embodiment, the pouch being shown in phantom; and FIG. 8 is a sectional view taken on the line 8—8 of FIG. 7.

THE PREFERRED EMBODIMENTS

A net scabbard or pouch constructed in accordance with each of the disclosed embodiments of the invention is adapted for use in providing support for a fisherman's landing net 1 having a handle 2 attached in any conventional manner to a loop 3 formed of metal or the like to which netting 4 is secured in a conventional manner. According to the embodiment shown in FIGS. 1–4 the support for the net comprises a pouch 5 having spaced, parallel front and back walls 6 and 7 joined at corresponding sides by webs 8 and at their lower ends by a bottom web 9. The webs are not essential; the side and bottom edges of the walls simply may be stitched together.

The upper end of the pouch has a mouth 10. The mouth 10 is maintained in open position by a stiffening member 11 formed of suitable gauge wire. The stiffening member has an elongate body section 12 terminating at its opposite ends in reversely turned struts 13 to form arms 14 that are spaced from and parallel the body section 12 and terminate short of one another in downwardly turned, parallel fingers or projections 15 which extend substantially normal to the section 12. The upper ends of the walls 6, 7 and the webs 8 are bound about the sections 12, 13, and 14 of the stiffener member 11 and secured by stitching 16 (FIG. 2) or the like. The projections 15, however, are bent as at 17 so as to occupy positions spaced from and parallel to the wall 7.

The pouch 5 is adapted to be fitted to a garment 18 that is worn by a fisherman. As shown, the garment 18 comprises a sleeveless vest having a back 19, but as used herein the term "garment" applies to a coat, harness, or any other article that may be fitted to the wearer so as to provide support for the pouch.

Means for securing the pouch 5 to the garment 18 comprises a pair of socket-forming members 20 having a raised center section 21 flanked by flanges 22. The raised sections 21 form tubular sockets. The members 20 may be formed of metal or rigid plastic and the flanges have openings 23 through which fastening means 24, such as rivets, stitching, or the like, pass to secure the members 20 to the back 19 of the garment 18.

Although it is not essential, the wall 7 of the pouch preferably is fitted with a fabric anchor strip 25 of known kind and the garment back 19 is fitted with a companion strip 26. These strips not only aid in the support of the pouch 5, but also prevent the net's inadvertently passing between the pouch and the back 19 of the garment when returning the net to the pouch.

To assemble the pouch 5 with the garment 18, the projections 15 of the stiffener 11 are seated in the sockets formed by the members 20, following which the anchor strips 25 and 26 are pressed together. The pouch 5 then is removably supported by the garment 18 in the manner shown in FIGS. 1 and 2.

The height of the projections 15 and the socket-forming members 20 is such as to prevent sagging of the open end of the pouch, thereby ensuring that the mouth 10 is always open upwardly.

When the pouch is fitted to the garment, the net 1 may be inserted into the pouch by passing the ring 3 and the netting 4 through the open mouth 10 and positioning the handle 2 to one side of the middle of the back 19. In this position of the handle a fisherman easily may reach behind him with one hand, grasp the handle 2, and remove the net from the pouch for use in landing a fish. When the net has served its purpose, the fisherman may return it to the pouch. Since the mouth 10 of the pouch is maintained open at all times by the stiffening member 11, one hand movement of the net out of and into the pouch is quick and easy.

The depth of the pouch and the open width of the mouth will depend on the size and thickness of the net.

If desired, the back 19 of the garment and the confronting wall 7 may be equipped with separable fasteners (not shown) at a level lower than that of the stiffening member 11 to prevent flapping of the pouch, but such fasteners normally are not required.

The embodiment shown in FIG. 5 employs the same pouch 5 described earlier, but in this instance the stiffening member 28 comprises an endless band of suitable, rigid or semirigid plastic or metal material in the form of a flattened loop having parallel, spaced apart runs 29 and 30 joined at corresponding ends by webs 31. The upper end of the pouch 5 is secured in any suitable way to the stiffening member 28 such as by riveting, stitching, cementing, and the like.

In the modified embodiment the means for securing the pouch 5 to the garment 18 comprises dovetailed sockets 32 fastened to the garment 18 by rivets 33 or the like and projections 34 of complementary cross-sections accommodated in the sockets and secured to the run 30 of the stiffening member by rivets 35 or the like. Preferably, the projections 34 taper and the socket forming members 32 are correspondingly shaped thereby assuring secure, frictional retention of the pouch 5 on the garment 18.

The embodiment shown in FIGS. 7 and 8 differs from the earlier described embodiments in that the pouch 36 is not separate from the garment 18, but instead comprises a single layer 37 of material that is stitched along its sides and bottom to the back 19 of the garment. The upper edge of the pouch 36 is hemmed and accommodates a stiffening member 38 of metal or plastic comprising an elongate run 39 reversely turned at its opposite ends to form legs 40 that are secured to the back 19 of the garment 18 by rivets 41 or the like. The legs 40 are spaced from the run 39 so as to provide an open mouth 42 at the top of the pouch 36.

In the disclosed embodiments the material from which the pouch is made preferably is a lightweight flexible fabric, such as a cotton/polyester blend, or nylon so as to be water repellent and sufficiently tough to resist snagging. Since the material is relatively moisture impervious, and since the mouth of the pouch always remains open, the bottom of the pouch preferably is provided with a plurality of holes 27 (see FIGS. 1–3) through which moisture may drain.

The disclosed embodiments are representative of presently preferred forms of the invention, but are intended to be illustrative rather than definitive thereof. The invention is defined in the claims.

I claim:

1. In the combination of a garment adapted to be worn by a fisherman; a scabbard for the removable accommodation of a landing net; and means for attaching said scabbard to said garment, wherein said garment has a layer of material forming a back and said scabbard forms a pouch having an upper end and a mouth at said upper end of such size as to enable said landing net to pass therethrough, the improvement comprising stiffening means carried by said pouch at said upper end thereof and maintaining said mouth open at all times, said attaching means comprising first anchor elements carried by said stiffening means and second anchor elements carried by the back of said garment, said first and second anchor elements being coupled to one another and securing said pouch directly to the back of said garment.

2. The combination according to claim 1 wherein said stiffening means comprises an endless, flattened loop.

3. The combination according to claim 1 wherein said stiffening means comprises a member having an elongate body reversely turned at opposite ends to form arms spaced from and substantially parallel to said body, said arms extending toward but terminating short of one another.

4. The combination according to claim 3 wherein each of said arms terminates in a substantially normal finger, said fingers being substantially parallel to one another.

5. The combination according to claim 1 wherein one of said anchor elements comprises socket-forming members carried by said garment and the other anchor elements comprises projections carried by said stiffening means and accommodated in said socket-forming members.

6. The combination according to claim 5 wherein said projections are removably accommodated in said socket-forming members.

7. The combination according to claim 1 wherein said first and second anchor elements are complemental in configuration.

8. The combination according to claim 1 wherein one of said anchor elements is tubular and the other of said anchor elements is complementary in cross-section to that of said one of said anchor elements.

9. The combination according to claim 1 wherein said first and second anchor elements are complementally dovetailed.

10. The combination according to claim 1 wherein said first and second anchor elements are seperable from one another.

* * * * *

UNITED STATES PATENT AND TRADEMARK OFFICE
CERTIFICATE OF CORRECTION

PATENT NO. : 4,723,695
DATED : February 9, 1988
INVENTOR(S) : Hugh A. Farber

It is certified that error appears in the above-identified patent and that said Letters Patent is hereby corrected as shown below:

In the abstract, line 5, change "stiffeningmember" to -- stiffening member -- .

Column 2, line 10, delete -- but with the net -- .

Column 4, line 47, after "other " insert -- of said -- .

Signed and Sealed this

Fifth Day of July, 1988

Attest:

DONALD J. QUIGG

*Attesting Officer*   *Commissioner of Patents and Trademarks*